April 28, 1970      H. R. MYERS      3,508,375

METHOD AND APPARATUS FOR COVERING A LOAD ON A PALLET

Filed July 25, 1968      2 Sheets-Sheet 1

INVENTOR.
HAROLD ROBERT MYERS
BY
*Marshall & Yeasting*
*Attorneys*

INVENTOR.
HAROLD ROBERT MYERS
BY
Marshall & Yeasting
Attorneys

United States Patent Office 3,508,375
Patented Apr. 28, 1970

3,508,375
METHOD AND APPARATUS FOR COVERING A LOAD ON A PALLET
Harold Robert Myers, Waterville, Ohio, assignor to Larry L. Kaufman Company, Toledo, Ohio, a corporation of Ohio
Filed July 25, 1968, Ser. No. 747,565
Int. Cl. B65b 43/29
U.S. Cl. 53—30                                            6 Claims

ABSTRACT OF THE DISCLOSURE

A method and apparatus for covering a load on a pallet by placing over the load an inverted bag made of heat-shrinkable film, heating the exterior of the bag, simultaneously withdrawing air from the lower end of the bag, as such a rate as to counteract expansion of air trapped in the bag as well as convection currents that tend to expand the bag during the heating, and continuing such withdrawal of air during subsequent cooling until the bag has shrunk to a taut condition around the load.

BACKGROUND OF THE INVENTION

The invention relates to a method and apparatus for covering a load on a pallet with a heat-shrinkable film, such as a polyethylene film.

It is advantageous to store and ship a large variety of products in the form of pallet loads, because of the ease with which pallet loads can be handled by a fork lift truck. In many cases it is desirable that pallet loads be covered to protect them against dust or moisture, to reduce pilferage, and to render the loads stable so that articles will not become dislodged from the loads during handling.

Heat-shrinkable films (such as films made of homopolymers or copolymers of ethylene or propylene) lend themselves to the covering of pallet loads and are widely used for such purposes. Any material that can be formed into a film that will shrink upon heating can be used. Such films, having been stretched during manufacture, shrink when reheated and subsequently cooled. A heat-shrinkable film used to cover a pallet load is impervious to moisture, and may be transparent so that the articles which make up the load can be inspected and identified. When the pallet is to be unloaded, a covering of film is easily cut with a knife and stripped away.

Considerable difficulty has been experienced, however, in forming coverings for pallet loads from heat-shrinkable films. The known procedure for covering a bundle of material with a heat-shrinkable film consists in wrapping the bundle with the film, or placing over the bundle a bag made of the film, and then passing the bundle through a "shrink tunnel" on a conveyor. In the shrink tunnel, through which the bundle is carried on a conveyor, the film is heated to a temperature high enough to cause the film, when subsequently cooled, to shrink into a tight wrapping upon the bundle.

When an attempt is made to use this conventional bundle wrapping procedure to cover a pallet load with a heat-shrinkable film, difficulty is experienced in shrinking the film upon the pallet load with the desired uniformity. This difficulty is due to the relatively large size of a pallet load and to the necessity of using a very thin film, usually not more than about .003 inch thick, for the sake of economy. Even when the heat-shrinkable film is made into a bag of the approximate size to fit the pallet load and is inverted over the pallet load, the heat-shrinking operation often produces such an irregular covering that it is necessary to strip off the faulty covering and to make another attempt to cover the pallet load with heat-shrinkable film.

SUMMARY OF THE INVENTION

The principal object of the invention is to provide a reliable and efficient method and apparatus for covering a load on a pallet with a heat-shrinkable film. More specific objects and advantages are apparent from the following description, which is intended to disclose and illustrate but not to limit the scope of the invention.

It has now been discovered that when a pallet load is wrapped with heat-shrinkable film, or when a bag of heat-shrinkable film is inverted over a pallet load, and the load is then passed through a shrink tunnel in accordance with conventional bundle-wrapping procedure, in order to shrink the film, much of the difficulty in obtaining a satisfactory uniform covering is due to undesirable ballooning of the film caused by entrapped heated air and by convection currents of air which occur during the heating operation. It is believed that such entrapped air and convection currents cause particular difficulty because of the relatively large size of a pallet load, and because of the necessity of using a low-cost film which is very thin and therefore is quite flimsy and is easily dislodged by convection currents.

In the practice of the present invention, an inverted bag of heat-shrinkable film is placed over the pallet load, but the load is not passed continuously through a shrink tunnel in accordance with conventional bundle-wrapping procedure. Instead, the loaded pallet, covered with an inverted bag of heat-shrinkable film, is brought to a stationary position upon a support. Then the exterior of the inverted bag is heated, while air is simultaneously withdrawn from the lower end of the bag at such a rate as to counteract convection currents and internal air expansion that tend to stretch the bag during the heating. The withdrawal of air from the lower end of the bag is continued during the heating and subsequent cooling operations until the bag has shrunk to a taut condition around the load. It has been discovered that when convection currents and expansion of air inside the bag are counteracted by withdrawing air from the lower end of the bag, in accordance with the present invention, the bag will shrink in a much more uniform manner so as to form a highly uniform covering upon the pallet load. It has been found that in accordance with the present invention, flapping and billowing of the flimsy plastic film is prevented by counteracting and neutralizing the convection currents, so that the film shrinks into a highly satisfactory, uniform covering upon the pallet load.

An apparatus for shrinking upon a pallet load an inverted bag of heat-shrinkable film, embodying the present invention, comprises a support for receiving a loaded pallet, apparatus for heating the exterior of the inverted bag while the pallet is in position on the support, an air outlet for withdrawing air from the lower end of the inverted bag while the pallet is in position on the support, and a suction device for withdrawing air through the outlet at such a rate as to counteract convection currents and expansion of air inside the bag during the heating and subsequent cooling operations.

DESCRIPTION OF THE PREFERRED EMBODIMENTS

Figure 1:
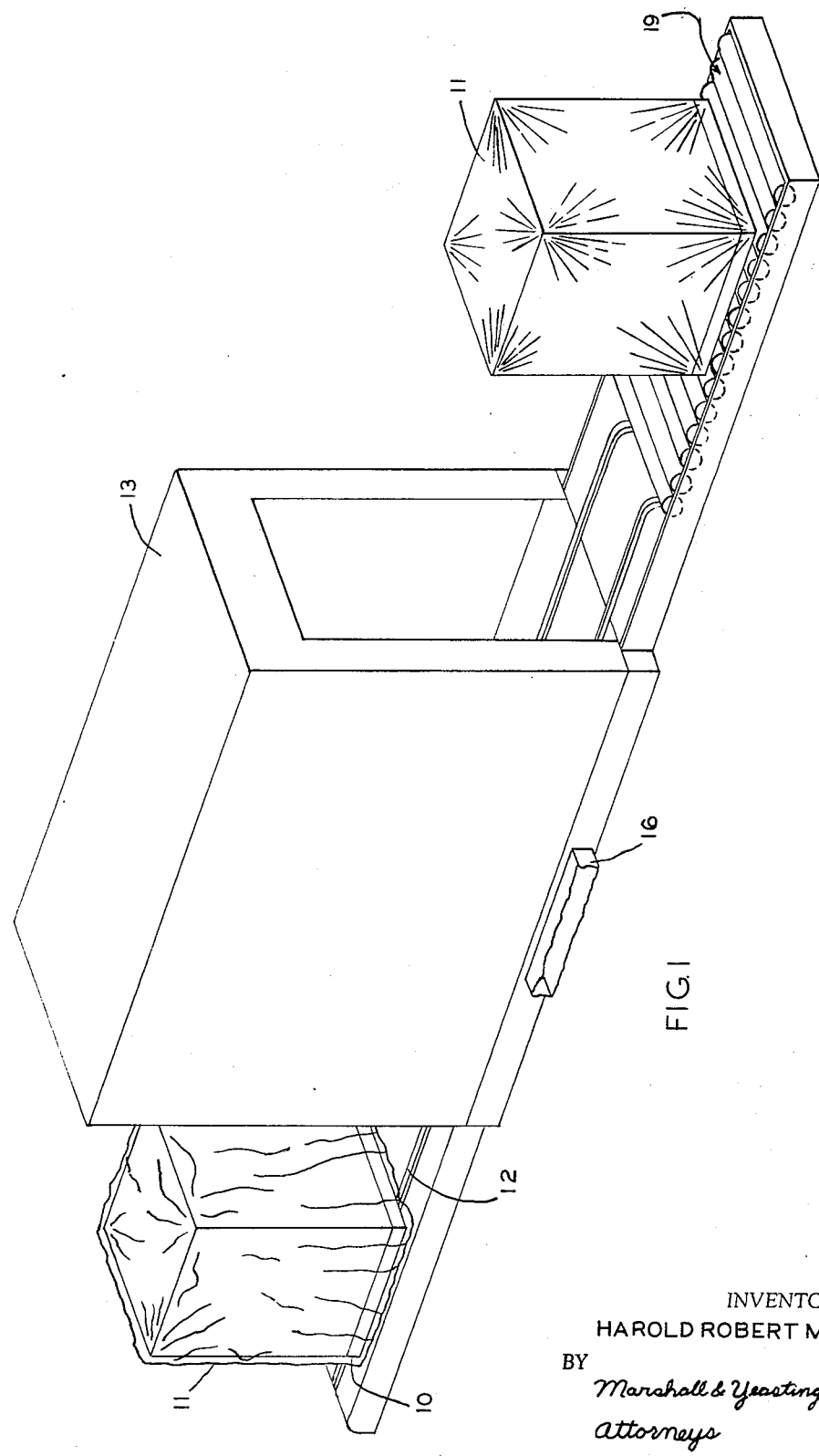
FIG. 1 is a diagrammatic view of an apparatus embodying the present invention.

In the practice of the present invention, a load on a pallet 10 is first enclosed in a loosely-fitting inverted bag 11 made of a heat-shrinkable film. The inverted bag 11 may be placed over the load manually, and the bag should fit loosely so that it can be pulled down over the pallet load without difficulty. Preferably the bag 11 is pulled down far enough around all sides of the pallet load so that the lower edges of the bag reach down as far as the bottom of the pallet 10, in order that the finished covering will enclose the side edges of the pallet, leaving no opening in the covering between the pallet and the load.

The preferred heat-shrinkable film of which the bag 11 may be made is a polyethylene film. Preferably the bag 11 is made of a film which shrinks predominantly in one direction, and the material for the bag is cut from the film in such a manner that the shrinkage of the inverted bag is primarily horizontal rather than vertical. Excellent results may be obtained by use of a bag which, when inverted over a pallet load and then heated and allowed to cool, shrinks about 25 percent in the horizontal direction and about 5 percent in the vertical direction. It is also possible to use a bag which shrinks substantially 50 percent in the horizontal direction.

For a load of moderate weight, from 1,000 to 1,500 lbs., such as a load of bottles or television tubes, the bag 11 preferably is made of a polyethylene film having a thickness of about .003 to about .004 inch. A polyethylene film having a thickness of .002 inch has relatively low strength, but may be used for a bag to cover a relatively light pallet load weighing 1,000 lbs. or less.

The greatest advantages are achieved in the practice of the present invention when the bag is made of a film having a thickness of .002 to .004 inch, because great difficulties have been experienced heretofore in the use of bags or coverings for pallet loads made of such thin plastic film. However, the present method and apparatus have been found to be advantageous also when the film of which the bag is made has a thickness of .005 to .006 inch, for example in covering a heavy load of 1,500 to 3,000 lbs., such as a pallet load of crude rubber or spark plugs. The present invention also may be used with a bag made of a film having a thickness of .008 to .010 inch for covering a pallet load of more than 3,000 lbs., such as a load of refractories, plaster board, or bags of portland cement.

The bag 11 also may be made of heat-shrinkable polyvinyl chloride film, which is relatively expensive but also has great strength and may be heat-shrunk with the use of relatively low temperatures. A bag made of heat-shrinkable polyvinyl chloride film having a thickness of .0015 inch is strong enough so that it can be used in place of a bag made of polyethylene film having a thickness of .004 inch.

Ordinarily the heat-shrinkable film of which the bag 11 is made is transparent, so that the pallet load can be inspected and identified after it has been covered with the film. However, in some cases it may be desirable to use a bag made of a heat-shrinkable film which is pigmented and therefore is opaque. For example when the articles in the pallet load are of such a nature as to attract pilferage, it may be desirable to use a film which is opaque in order to reduce pilferage by concealing the contents of the load.

A pigmented film also is more resistant to deterioration when the load is exposed to sunlight.

In any event, it is desirable that the inverted bag 11 form a seal around the sides and over the top of the pallet load, so that moisture or dust which settles upon the exterior of the bag 11 will be prevented from entering the pallet load.

The pallet 10, carrying a load over which the loosely fitting bag 11 has been placed, is moved by means of a conveyor 12 into an oven 13. The oven 13 preferably is a circulating hot air oven. Infrared heating may be used in the oven 13 instead of circulating hot air if desired. However, circulating hot air is preferred because it facilitates heating all portions of the bag 11 uniformly, and because by controlling the temperature of the hot air it is possible to control the heating precisely so that the temperature is high enough to shrink but not high enough to melt the film.

Figure 2:
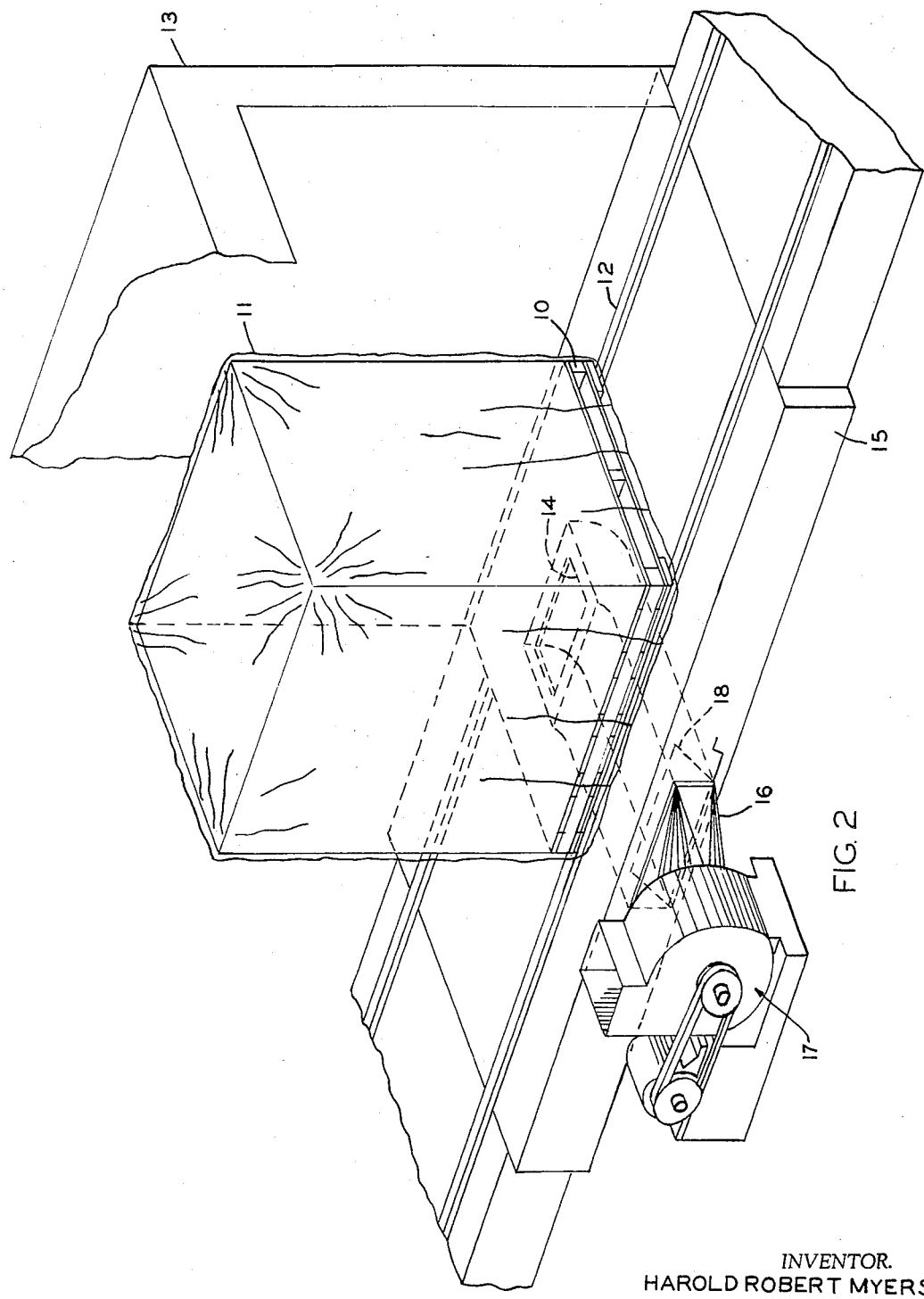
FIG. 2 is a view on an enlarged scale of a portion of the apparatus shown in FIG. 1.

The oven 13 is provided with an air outlet for withdrawing air from the lower end of the inverted bag surrounding the load on the pallet 10. Preferably the air outlet 14, as shown in FIG. 2, is so located as to be beneath the pallet 10 when the pallet is located on a support 15 which holds the pallet in position to be heated in the oven 13. The outlet 14 is connected by a duct 16 to a suitable suction device 17, which withdraws air through the outlet 14 at such a rate as to counteract convection currents and entrapment of heated air that would tend to expand the bag 11 during the heating operation. The rate at which air is withdrawn through the outlet 14 may be controlled for example by means of a damper 18 in the duct 16.

The withdrawal of air through the outlet 14 prevents the formation of internal convection currents which would cause the bag 11 to flap and billow during the heating operation, particularly when the bag 11 is made of an extremely light material having a thickness of only about .003 inch. Thus the present method and apparatus permit the bag 11 to shring uniformly upon the pallet load upon cooling, so that when the pallet load is removed from the oven 13 the bag 11 has uniform tautness and is free from bulges, and the finished pallet load is covered uniformly by the bag 11 as shown at the right end of FIG. 1.

The present method and apparatus also cause the lower portion or skirt of the bag 11 to hang down all around the pallet, and prevent convection currents from lifting the skirt of the bag 11 during the heating operation and thus prevent the formation of an opening or gap between the lower edge of the bag 11 and the pallet 10.

In order to counteract convection currents, the air should flow inward in all directions toward the outlet 14. Thus it is desirable that the outlet 14 be located centrally of the pallet when the pallet is in position on the support 15 to be heated in the oven 13. The outlet 14 may be of any convenient size, and may consist of a single outlet or an annular series of outlets, centrally arranged with respect to the pallet 10. The outlet or annular series of outlets need not be located within the horizontal confines of the pallet 10, but may extend beyond the edges of the pallet so that air is drawn directly downward around the sides of the bag 11.

In a typical heating operation, the loaded pallet 10 remains in position on the support 15 in the oven 13 for a period of about 60 to 90 seconds while air at about 310° F. is circulated in contact with the exterior of the bag 11, and while air is withdrawn through the outlet 14. If desired, cooler air may then be circulated in contact with the bag 11 to complete the shrinking of the bag, while air continues to be withdrawn through the outlet 14. The finised pallet load is then moved on the conveyor 12 to a receiving station 19. A fork lift truck, when used to remove the finished load, will puncture the bag 11 along one edge of the pallet, but the tightly fitting bag 11 will not be disturbed above the punctures which are made by the fork lift truck, and the load will remain sealed in the bag 11.

The pallet load which is to be covered may consist of a load of any articles such as small cartons, canned goods, or trays of glassware, bottles or other receptacles. The finished pallet load is extremely stable during handling because the inverted bag 11 is uniformly and tightly shrunk upon the load. The load is completely sealed by the bag 11 at the sides and top, but when the pallet is to be unloaded the bag 11 is easily cut open and stripped away from the load.

In the practice of the present invention, the only effect of withdrawing air from the lower end of the bag is to counteract expansion from entrapment of hot air inside the bag and convection currents, so as to cause the inverted bag to remain undisturbed during the heating and cooling operations and to allow the inverted bag to shrink uniformly to a covering of the desired tautness which encloses the entire pallet load.

I claim:

1. A method of covering a load on a pallet that comprises the steps of placing over the load an inverted bag made of a heat-shrinkable film, heating the exterior of the bag, simultaneously withdrawing air from the lower end of the bag, at such a rate as to counteract convection currents that tend to expand the bag during the heating, and continuing such withdrawal of air until the bag has shrunk to a taut condition around the load.

2. A method according to claim 1 wherein the exterior of the bag is heated by currents of hot air.

3. A method according to claim 1 wherein air is withdrawn from the lower end of the bag by withdrawing air beneath the pallet.

4. Apparatus for shrinking upon a pallet load an inverted bag of heat-shrinkable film, comprising a support for receiving a loaded pallet, apparatus for heating the exterior of an inverted bag surrounding the load on a pallet that is in position on the support, an air outlet for withdrawing air from the lower end of such an inverted bag surrounding the load on a pallet that is in position on the support, and a suction device for withdrawing air through the outlet at such a rate as to counteract convection currents that tend to expand the bag during the heating.

5. Apparatus according to claim 4 wherein the heating apparatus directs heated air against the exterior of the inverted bag.

6. Apparatus according to claim 4 wherein the air outlet is so located as to be beneath a pallet that is in position on the support.

References Cited

UNITED STATES PATENTS 3,289,385  12/1966  Syverson et al. _____ 53—24 X
3,429,095  2/1969   Huson _____ 53—24

FOREIGN PATENTS 1,467,274  12/1966  France.

THERON E. CONDON, Primary Examiner

E. F. DESMOND, Assistant Examiner

U.S. Cl. X.R.

53—184; 206—45.33